March 4, 1952     E. K. KARLSSON     2,587,857
ENDLESS BELT SNAPPING ROLLS
Filed Sept. 30, 1948     2 SHEETS—SHEET 1
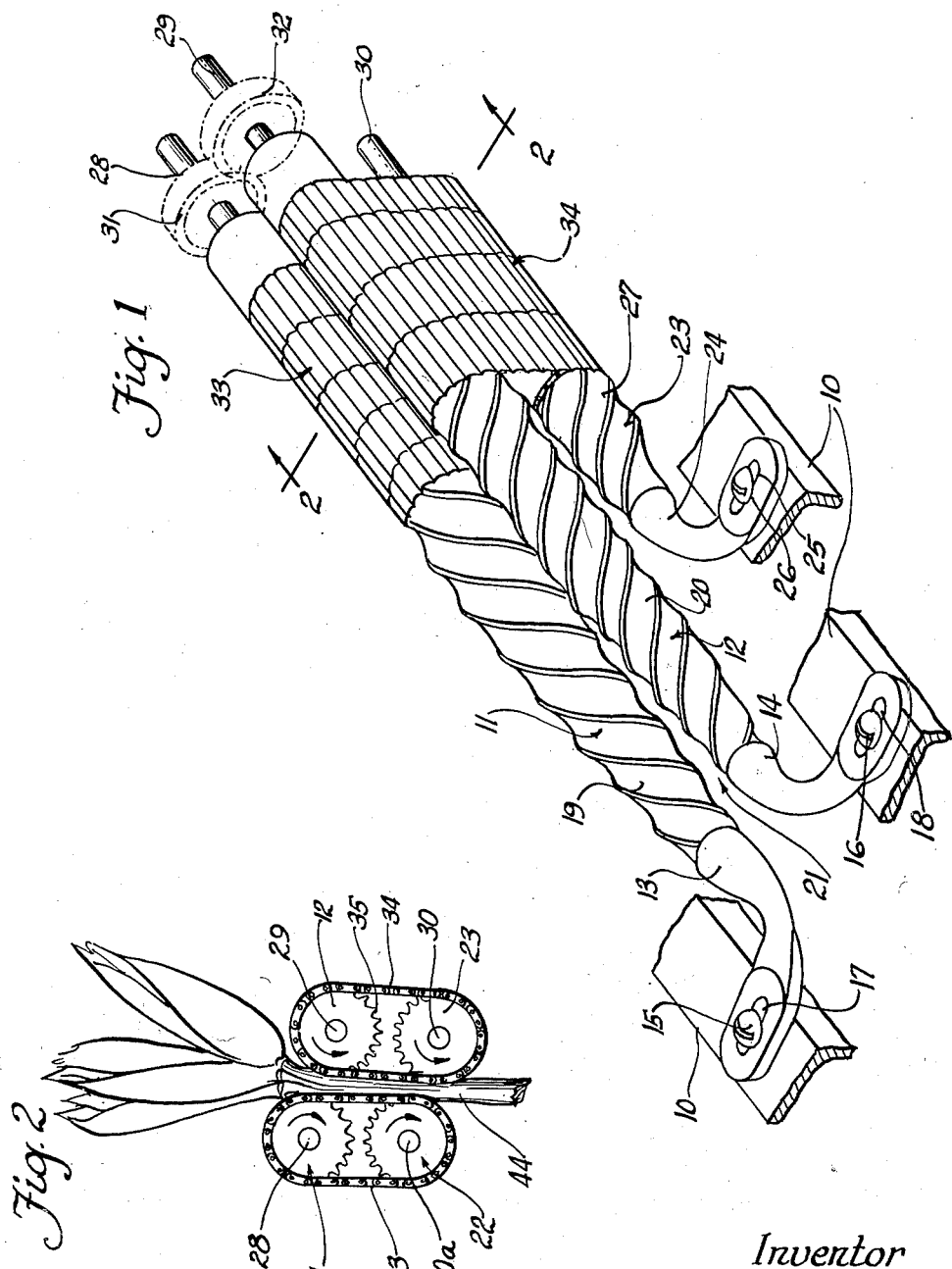
Inventor
Elof K. Karlsson
by Paul O. Pippel
Atty March 4, 1952 E. K. KARLSSON 2,587,857
ENDLESS BELT SNAPPING ROLLS
Filed Sept. 30, 1948 2 SHEETS—SHEET 2
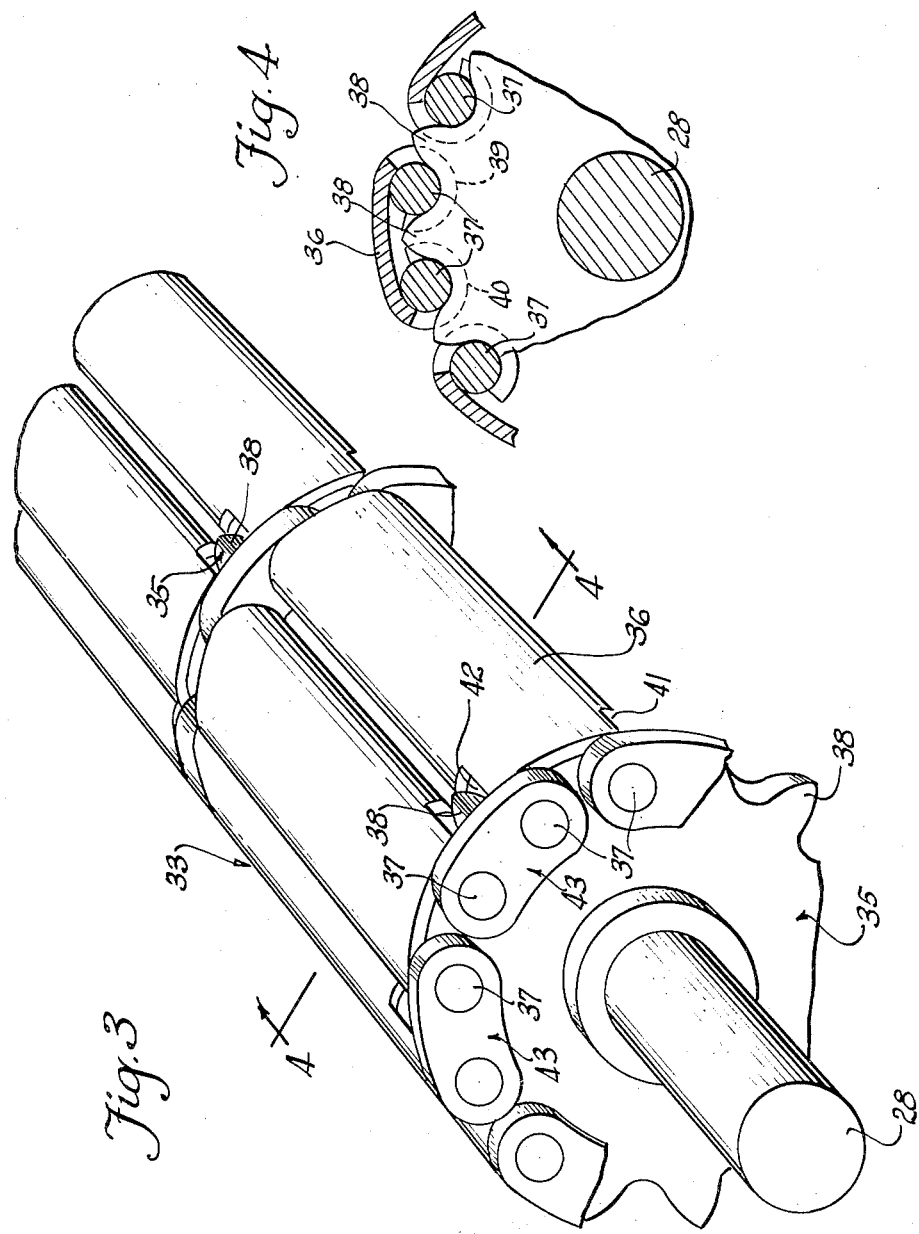
Inventor.
Elof K. Karlsson
by Paul O. Pippel
atty Patented Mar. 4, 1952

2,587,857

UNITED STATES PATENT OFFICE 2,587,857

ENDLESS BELT SNAPPING ROLLS

Elof K. Karlsson, Moline, Ill., assignor to International Harvester Company, a corporation of New Jersey Application September 30, 1948, Serial No. 52,113

3 Claims. (Cl. 130—5)

This invention relates to new and improved endless belt snapping rolls.

Corn snapping rolls are designed to operate in pairs and must engage a stalk and pull it downwardly therethrough until the ear on the stalk is snapped therefrom. Rolls are cylindrical and when in cooperative relationship with each other may make only a line contact. Corn snapping rolls have in the past been provided with many outer surface configurations for the purpose of making the most of the line contact and pulling the stalk down between the rolls. Oftentimes the rolls have been made so aggressive that the stalk passing therethrough would be torn apart and broken off prior to the snapping of the ear. In still other instances, when the rolls have been too aggressive there has been considerable shelling of corn at the time of snapping. Both of these are, of course, undesirable and yet if the rolls are not sufficiently aggressive to move the stalk downwardly for snapping, it also is considered very undesirable.

It is a principal object of this invention to provide endless belt snapping roll means which increase the surface available for contacting the stalk from the line contact of the ordinary rolls to a substantial distance of perhaps eight to ten inches.

An important object of this invention is the provision of means in corn snapping rolls for engaging the stalk for a substantial length of the stalk to effect easy downward feeding of the stalk between the rolls without damaging the rolls or causing corn to be shelled at the time of snapping.

Another important object of this invention is to provide cooperative endless belt snapping means adapted to easily and economically feed stalks therethrough and cause snapping of the rolls during a firm yet undamaging grip by the cooperative endless belts.

A still further important object of this invention is the provision of multiple rolls in a corn picker snapping machine and having endless belts arranged over certain of the multiple rolls in such a manner that the long flat surfaces of the endless belts lie parallel to one another and sufficiently close so as to engage a stalk over the full length of the endless belts and feed the stalk downwardly between the multiple rolls regardless of irregularities in the diameters of any individual portion of the stalk.

Other and further important objects of this invention will become apparent from the disclosures in the following specification and accompanying drawings.

In the drawings:

Fig. 1 is a perspective view showing the endless belt snapping rolls of this invention.

Fig. 2 is a sectional view taken on the line 2—2 of Fig. 1 and showing a corn stalk therein.

Fig. 3 is an enlarged perspective detail of a portion of the endless belt as shown in Figs. 1 and 2.

Fig. 4 is a sectional view taken on the line 4—4 of Fig. 3.

As shown in the drawings, the reference numeral 10 indicates generally the frame work or supporting structure on a corn picker whether it be a tractor-mounted machine or a pull-behind machine. Cooperative rolls 11 and 12 are journaled at their forward ends in bracket members 13 and 14 respectively. The brackets or bearings 13 and 14 are fastened to the support or frame work 10 by means of bolts or the like 15 and 16, which pass through elongated slots 17 and 18 in the outer end portions of the bearing brackets 13 and 14. The spacing of the rolls 11 and 12 thus may be varied by shifting of the rolls inwardly or outwardly through the elongated slots 17 and 18. The surfaces of the rolls 11 and 12 are spirally grooved or ribbed as shown at 19 and 20 and as a stalk of corn enters the V-shaped space 21 at the forward end of the rolls it is carried rearwardly between the inwardly turning rolls by the mating spiral grooves 19 and 20.

A second pair of rolls 22 and 23 are disposed beneath and parallel the rolls 11 and 12 respectively. As shown in Fig. 1 the roll 23 is journaled in a bearing bracket 24 which also has an elongated slot 25 for variable lateral spacing on the frame work 10 by means of a bolt or the like 26. Similar to the rol's 11 and 12 the rol's 22 and 23 are provided with a spiral groove surface 27 extending upwardly and rearwardly over a portion of the length thereof.

The upper ends of the rolls 11, 12 and 23 are provided with shafts 28, 29 and 30 respective'y for journally supporting the rolls in suitable bearings on the frame work 10. The shaft for the roll 22 is not shown in Figure 1 but is shown in Figure 2 at 30ª. The bearings have not been shown as they form no part of the present invention. The rolls are driven through one shaft, preferably 28, and gear means 31 and 32 mounted on the shafts 28 and 29 respectively impart drive from the roll 11 to the roll 12 in an opposite direction. The rolls are adapted to rotate inwardly toward each other.

Endless conveyor belts 33 and 34 pass over and around the vertically alined and spaced rolls 11 and 22 and 12 and 23 respectively as best shown in Fig. 2. The construction of the belt is shown in detail in Figs. 3 and 4. Sprockets 35 are fixed to the roll shafts 28 and 29 at regularly spaced intervals above the spiral channel surface 19. The belt 33 is composed of a plurality of link members 36, each of which carries a pair of rod members 37 which, as shown in Fig. 4, ride between the sprocket teeth 38. As shown in this same figure, the links 36 engage the rods 37 by downwardly and upwardly turned forward and rearward edges 39 and 40 respectively. The ends of the links 36 are notched at 41 and 42 for the purpose of permitting outward projection of the sprocket teeth 38. End adjoining links 43 connect adjacent rod members of adjacent links 36 and lie against the outer surface of the sprocket 35. It has thus been shown that the belt 33 and similarly the belt 34 is fully flexible and continuous with a plurality of links, and as the stalk enters a position between the rolls as shown in Fig. 2, the opposing links 36 engage a substantial length of perhaps eight to ten inches of the stalk 44. The fact that the stalk is gripped over such a considerable length eliminates the necessity of deeply gouging the stalk as when it is gripped merely at one point by a pair of ordinary snapping rolls. The long gripping surface of the cooperative belts 33 and 34 securely and easily grips the stalk and forces it downwardly therethrough. Variations in stalk diameter are not detrimental to the feeding of the stalk for the reason that it is gripped over such a long length thereof. Engaging the stalk by the endless belts or chain members 33 and 34 assists in maintaining full control over the stalk up to the time of snapping the ear therefrom and thereafter to discharge the stripped stalk.

Ear snapping is more easily accomplished without damage or shelling of any corn by the snapping rolls having these endless belts for the reason that there are no aggressive teeth which can cut into the surface of the ear such as often occurs with regular snapping rolls.

Numerous details of construction may be varied throughout a wide range without departing from the principles disclosed herein and I therefore do not propose limiting the patent granted hereon otherwise than as necessitated by the appended claims.

What is claimed is:

1. A corn snapping mechanism comprising a supporting structure, first and second rolls cooperating with each other to constitute a first pair of rolls, said first and second rolls journaled for rotation on said supporting structure, third and fourth rolls cooperating with each other to constitute a second pair of rolls, said third and fourth rolls journaled for rotation on said supporting structure, means for driving said rolls of each pair of rolls inwardly toward each other whereby the first and third rolls rotate in a first direction and the second and fourth rolls rotate in a second direction, said second pair of rolls disposed vertically beneath the first pair of rolls wherein the first and third rolls are in substantial vertical alignment and the second and fourth rolls are in substantial vertical alignment, a first flexible belt extending around the first and third rolls and a second flexible belt extending around the second and fourth rolls, means for imparting drive from the rolls to the flexible belts whereby the first and second flexible belts run downwardly at their cooperative inner mating surfaces, whereby the first and second flexible belts cooperate with each other to feed corn stalks downwardly therebetween with the stalk being effectively gripped over substantially the full length of the flexible belts, said rolls having portions extending beyond the flexible belts, said portions having spiral grooves so that the rolls of the first and second pairs of rolls cooperate to feed corn stalks along to the flexible belts.

2. A device as set forth in claim 1 in which journals support the first and second pairs of rolls in an inclined position to the horizontal from the feed end of the rolls upwardly toward the discharge end.

3. A device as set forth in claim 2 in which the portions extending beyond the flexible belts in the direction of the low position of the second pair of rolls terminate short of the end of the portions extending in the same direction beyond the flexible belts of the first pair of rolls.

ELOF K. KARLSSON.

REFERENCES CITED

The following references are of record in the file of this patent:

UNITED STATES PATENTS

| Number | Name | Date |
|---|---|---|
| 59,324 | Mathew | Oct. 30, 1866 |
| 407,423 | Stickney | July 23, 1889 |
| 877,461 | Hall | Jan. 21, 1908 |
| 1,017,625 | Gibbons | Feb. 13, 1912 |
| 1,404,813 | Varker | Jan. 31, 1922 |
| 1,766,348 | Van Nortwick | June 24, 1930 |
| 1,835,190 | Stansbury | Dec. 8, 1931 |
| 2,026,761 | Urschel | Jan. 7, 1936 |
| 2,169,070 | Kuhlman | Aug. 8, 1939 |
| 2,234,447 | Norman | Mar. 11, 1941 |
| 2,360,131 | Hitchcock | Oct. 10, 1944 |